C. G. LUNDSTROM.
ATTACHMENT FOR LAWN RAKES.
APPLICATION FILED OCT. 25, 1920.
1,371,499. Patented Mar. 15, 1921.
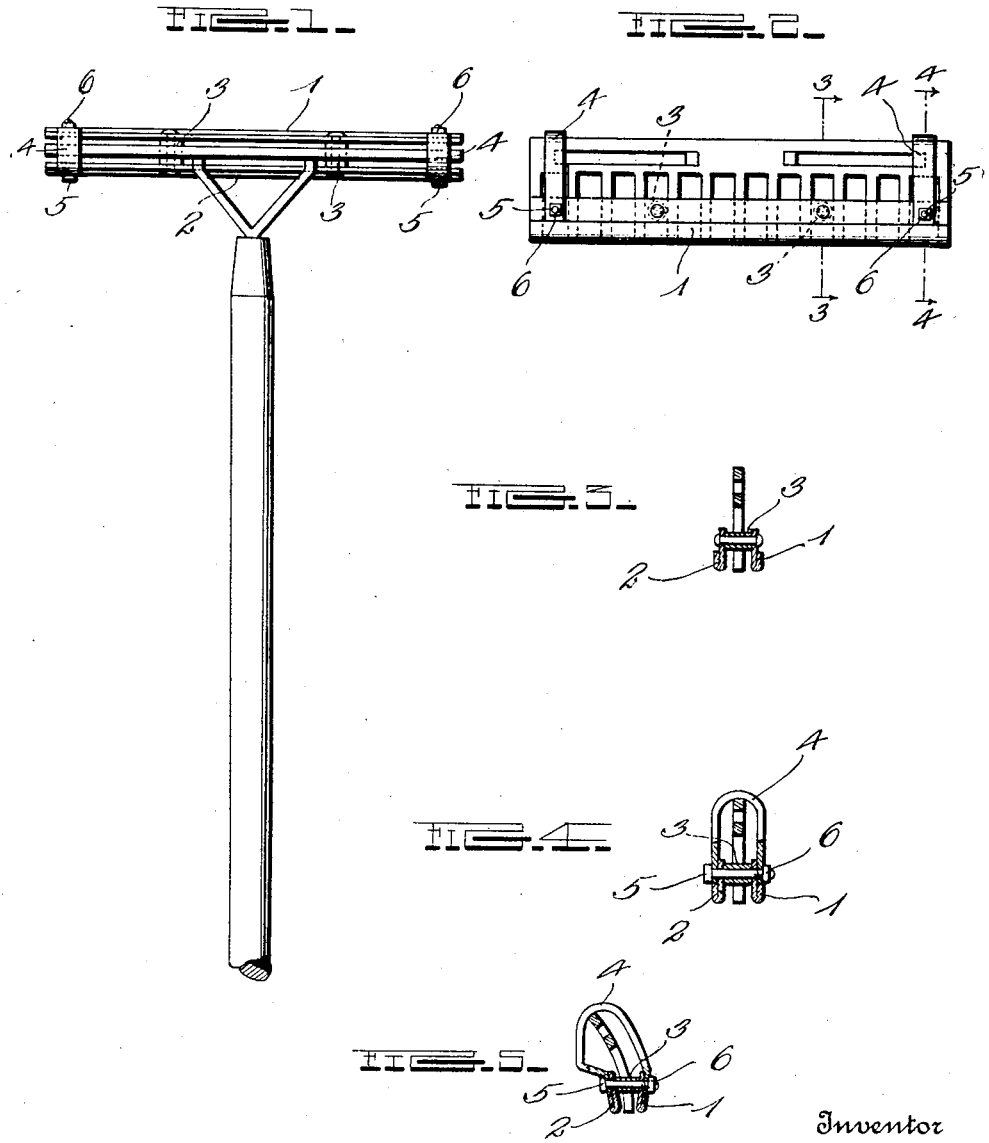
Witness
Inventor
Charles G. Lundstrom
By
Attorneys

UNITED STATES PATENT OFFICE.

CHARLES G. LUNDSTROM, OF BIRMINGHAM, ALABAMA.

ATTACHMENT FOR LAWN-RAKES.

1,371,499.

Specification of Letters Patent.  Patented Mar. 15, 1921.

Application filed October 25, 1920. Serial No. 419,322.

*To all whom it may concern:*

Be it known that I, CHARLES G. LUNDSTROM, a citizen of the United States, residing at Birmingham, in the county of Jefferson and State of Alabama, have invented certain new and useful Improvements in Attachments for Lawn-Rakes; and I do declare the following to be a full, clear, and exact description of the invention, such as will enable others skilled in the art to which it appertains to make and use the same.

This invention relates to an improved attachment for rakes, and has for its object to provide a novel device for removing leaves and grass from the teeth of the rake, promoting the effectiveness of the rake and permitting it to be drawn through the grass more easily.

Another object of the invention is to generally improve upon devices of this class by providing one of extreme simplicity and durability which is automatic in operation, is extremely easy to attach and detach and is very inexpensive to both the manufacturer and the user. Other objects and advantages of the invention will be apparent during the course of the following description.

In the accompanying drawings forming a part of the specification and in which like numerals are employed to designate like parts throughout the same:

Figure 1 is a top plan view of a conventional type of lawn rake with my improved cleaning attachment associated therewith.

Fig. 2 is an end elevation looking toward the rake head, showing the improved cleaner in its normal position.

Figs. 3 and 4 are sectional views taken on the planes of lines 3—3 and 4—4 respectively of Fig. 2.

Fig. 5 is a sectional view of a slightly modified form of my invention.

Briefly described, the attachment comprises a pair of spaced parallel cleaner-bars which are adapted for disposition on opposed sides of the teeth of the rake, and pivotally mounted retaining means for the bars. This pivotally mounted retaining means facilitates the attachment and detachment of the device.

Referring to the drawings, wherein the preferred embodiment of the invention is clearly illustrated, it will be seen that the numerals 1 and 2 designate a pair of flat metal bars or strips arranged in parallelism to one another and held in spaced relationship by means of a plurality of spacing sleeves 3, which are soldered or otherwise connected thereto. At this point, I wish to mention that these sleeves 3 not only serve the above function, but they also serve the additional functions of constituting stops for limiting the upward movement of the cleaner bars, and, in view of the fact that they are positioned between some of the teeth, they assist in removing the undesirable particles from the teeth. These cleaner bars are held in position on the rack head by novel retaining means, preferably in the form of loops 4. These loops are composed of strips of metal bent into substantial U-shaped formation, and the free ends of the strips are apertured and positioned in alinement with the aforementioned sleeves 3, suitable means being passed through these apertures and sleeves for pivotally connecting these strips to the bars 1 and 2. By preference the fastening means which I employ is in the form of bolts and nuts 5 and 6 respectively. With this construction it is possible to remove the members 4 whenever desired or necessary, and at the same time, this construction serves as an effective pivotal mounting for these members.

By referring to Fig. 5, a slightly modified form of the invention may be seen. In this figure, the same type of cleaner-bars is employed and they are held in spaced relation by the novel sleeves already described. The only difference of construction disclosed in this figure resides in the retaining members 4, which are so bent as to accommodate the attachment for use in connection with rakes having curved teeth. At this point I may mention, as before intimated, that the employment of bolts 5 enables me to make use of either the retaining members disclosed in Figs. 1 to 4 inclusive, or the type of retaining members disclosed in the figure under consideration. If desirable, the lower edges of the cleaner-bars may be directed toward each other in the manner shown in this figure to effect a more thorough removal of the weeds.

The operation of the attachment is as follows: As the rake is drawn through the grass, the grass will move the cleaner-bars 1 and 2 to their uppermost position where the sleeve 3 will be in engagement with the lower edge of the rake head. These bars will remain in position until the rake is lifted and moved by the operator to a new starting place. As soon as the rake has been once lifted the bars will, because of their own weight, move to the position disclosed in Fig. 2 and will thus remove all weeds and brush from the teeth of the rake. Should the weeds become hung on the teeth in such a manner as to prevent operation of the cleaner-bars, the rake head may be inverted and the members 4 brought into engagement with the ground. Then, by exerting a downward push on the rake head, the cleaner-bars will be brought into operation and the weeds or brush easily removed.

It is obvious, from the drawings, that in order to attach the device, it is only necessary to move the retaining loops into a substantial alinement with the cleaner-bars, place the latter on opposite sides of the teeth in the manner disclosed, and then swing the loops up over the upper edge of the rake head.

Careful consideration of the foregoing description taken in connection with the accompanying drawings should be sufficient to enable persons skilled in the art to which the invention relates to obtain a clear understanding of the same, therefore, a more lengthy description is deemed unnecessary.

Since probably the best results may be obtained with the construction and arrangement shown and described, this construction and arrangement is taken as the preferred embodiment of my invention. However, I wish it to be understood that various minor changes in shape, size, and arrangement of parts may be resorted to without departing from the spirit of the invention or the scope of the adjoined claim.

I claim:

A rake cleaner attachment comprising a pair of separate gravity-lowered cleaner-bars adapted for disposition on opposite sides of the rake teeth, spacing sleeves between said bars, constituting stops to limit the upward movement of the latter, and also forming means to assist in the cleaning operation, a pair of metal straps bent into inverted U-shape and having their free ends in contact with the outer sides of said bars and provided with apertures alined with said sleeves, and bolts passing through said apertures and sleeves, to secure all the parts together and to frictionally bind said straps against said cleaner-bars while permitting the straps to be swung either over the rake head for holding the device in position thereon or away from the rake head to permit detachment of the device from the latter.

In testimony whereof I have hereunto set my hand.

CHARLES G. LUNDSTROM.